US006639003B2

(12) United States Patent
Borsinger et al.

(10) Patent No.: US 6,639,003 B2
(45) Date of Patent: Oct. 28, 2003

(54) RUBBER ADDITIVE

(76) Inventors: Gregory G. Borsinger, 17 Pembrooke Rd, Chatham, NJ (US) 07929; Craig Cawley, 335 Wycliffe Dr., Houston, TX (US) 77079

( * ) Notice: Subject to any disclaimer, the term of this patent is extended or adjusted under 35 U.S.C. 154(b) by 0 days.

(21) Appl. No.: 09/950,214

(22) Filed: Sep. 11, 2001

(65) Prior Publication Data

US 2003/0069346 A1 Apr. 10, 2003

(51) Int. Cl.[7] .................................................. C08K 5/01
(52) U.S. Cl. .................. 524/487; 524/504; 430/58; 430/59; 430/110; 430/108.1; 138/137
(58) Field of Search ................. 524/487, 504; 430/58, 108.1, 110, 59; 138/137

(56) References Cited

U.S. PATENT DOCUMENTS

| | | | | |
|---|---|---|---|---|
| 3,819,566 A | * | 6/1974 | Pinsky et al. | 523/171 |
| 4,965,304 A | * | 10/1990 | Bethea et al. | 524/123 |
| 5,100,947 A | * | 3/1992 | Puydak et al. | 524/423 |
| 5,272,029 A | * | 12/1993 | Sakai et al. | 430/59.6 |
| 6,133,378 A | * | 10/2000 | Davis et al. | 525/240 |

* cited by examiner

Primary Examiner—David W. Wu
Assistant Examiner—Henry Hu
(74) Attorney, Agent, or Firm—Thomas L. Adams (57) ABSTRACT

An additive for use in compounding rubber provides for improved process ability and enhanced resistance to cracking as a result of ozone exposure. The additive preferably comprises a polyethylene wax homopolymer having a number-average molecular weight number (Mn) of approximately 1000–1100 and melt viscosity of 20–40 mPas. The additive can be used in the manufacture of tires, belts, hoses, air springs and roofing membranes.

4 Claims, 7 Drawing Sheets

Figure 2. Rubber Processability-Strain Sweep

Fig 6 - Static Ozone (ASTM D1149)

RUBBER ADDITIVE

FIELD OF THE INVENTION

The present invention is a rubber additive comprising a low molecular weight polyethylene wax. The additive is used in rubber compounding and increases the processability of the rubber compounds and also enhances the rubber compound's resistance to attack by ozone.

BACKGROUND OF THE INVENTION

Rubber is inherently difficult to process and mold because of its high viscosity. Rubber is also subject to degradation and attack by ozone and ultraviolet ("UV") light. Both of these phenomena are well known to those practiced in the art of compounding rubber.

Rubber formulations also contain a number of additives, which are used for purposes, such as, but not limited to, improve the processability of the rubber, and reduce the degradation of rubber caused by the effects of ozone and UV light.

Traditional additives used to improve processability of rubber have included polyethylene waxes. A commonly used polyethylene wax for use in improving process ability is commercially available from Honeywell (Morristown, N.J.) and is sold under the A-C®617 name. This polyethylene wax is a relatively soft with a hardness (@25 degrees C.) of 6–9 dmm, a Mettler drop point of 101 degrees C., a molecular weight of approximately 3000, and a density of 0.91 g/cc. There are several other suppliers of similar polyethylene waxes including Eastman Chemical (Kingsport, Tenn.) Epolene® wax and Mitsui (Tokyo Japan) Hi-Wax™

Polyethylene waxes are derived from polymerization of ethylene under conditions that restrict the polymer length there by rendering the final product with wax like characteristics. The traditional polyethylene waxes used in rubber processing have molecular weights in the 2000 to 3000 Mn range. Traditional polyethylene waxes used as processing aids in rubber compounds have been used sparingly because of their effects on reducing adhesion and green tack of rubber. In fact suppliers promote traditional polyethylene waxes as tack reducing compounds for those instances where reduced tack is desirable. In most instances, however, such as tire building, high levels of green tack aids in building of tires and is generally a desirable property.

To improve the resistance of rubber to the effects of ozone and UV light, rubber compounders have traditionally used combinations of static and dynamic antidegradants. Commonly used dynamic antiozonants include 2,4,6-Tris-(N-1, 4-Dimethylpentyl-p-Phenylenediamino)-1,3,5-Triazine supplied by Uniroyal Chemical under the brand name Durazone®37, or N-isopropyl-N'-phenyl-p-phenylenediamine- supplied by Monsanto Chemicals. Another dynamic antiozonant is N-(1-methylhexyl)-N'-phenyl-p-phenylenediamine (6PPD), which is supplied by several chemical companies.

Rubber additives that are used to protect against static ozone attack are microcrystalline waxes that are sold under a variety of tradenames, such as Astor® (Honeywell, Inc., Morristown N.J.); Norcheck®, by IGI International. Antiozonant microcrystalline waxes are derived from petroleum, and refined from slack wax to fractionate and separate out the microcrystalline fraction. The molecular weights of microcrystalline waxes are typically in the 600–700 Mn range. The microcrystalline waxes are used to provide a physical barrier on the surface of a rubber article, such as a tire. This physical barrier prevents attack on the rubber from ozone present in the atmosphere. The surface film of microcrystalline wax is sacrificial and is constantly being regenerated through a phenomenon called blooming. Blooming is the process where the microcrystalline wax, due to its incompatibility with rubber, continually migrates to the rubber surface. The rate of migration is a complex situation effected by time, heat, concentration of wax, chemical make-up of the rubber, and other factors. Microcrystalline wax use in tires has been limited due to the adverse effect high levels have on adhesion and green tack of the rubber compound.

Various applications of polyethylene waxes and microcrystalline waxes have been described in the prior art.

In U.S. Pat. No. 4,161,202 Powell et al. disclose using a low molecular weight (approximately 2000) polyethylene wax, having a melting point of approximately 78 degrees C., as an internal coating in a tire to render the tire puncture resistant. The polymer has the properties of a stiff grease which will not liquefy, but which will penetrate voids such as a puncture under the influence of inflation pressure.

Messerly et al. (U.S. Pat. No. 4,096,898) disclose using low molecular weight polyethylenes (molecular weights ranging from 1000–50,000, and having a density of approximately 0.88), as an internal tire lubricant. The compound is described as being a polyolefin grease, becoming liquid at a temperature of approximately 85 degrees C.

Ganster et al (U.S. Pat. No. 4,309.378) discloses using polyethylene wax as a release agent in tire manufacturing. The particular polyethylene is a polyethylene adipate having a molecular weight of approximately 2000.

In U.S. Pat. No. 3,992,502, Krishman discloses the use of polyethylene or polyethylene waxes as mold release agents in the formation of rubber products, to prevent adhesion of the finished product to the mold.

In U.S. Pat. No. 4,082,706 Danielson describes problems that occur when waxes are used as an antiozonant in a rubber formulation. He notes the limited success of waxes because of the difficulty of insuring that the wax layer remains intact. The wax film often separates or tears, causing cracks to develop of greater magnitude than articles having no wax, under the stresses to which the articles are subjected. The antiozonant compounds described are enamines.

Wheeler et al. (U.S. Pat. No. 4,956,405) describe the use of waxes to inhibit ozone cracking in articles under stress in static conditions by incorporating the wax into rubber compounds before vulcanization. They indicate the wax migrates to the surface of the article, forming a film which acts as a physical barrier to protect the article from ozone attack. The problem they note is that the wax film becomes cracked or disrupted during use of the article, and may cause cracks of greater severity than if no wax were used in the formulation, leading them to state "for many service conditions, the use of wax is impractical due to the dynamic conditions under which the article is expected to perform" (col. 1, lines 63–col. 2, line 7). The novel antiozonant compounds of this invention are tris-(N-alkyl-p-phenylenediamino)-1,3,5-triazines, and their use in a variety of elastomeric products, such as industrial belts, hoses, air springs, and roofing membranes are described.

In U.S. Pat. No. 5,120,779 Cornell et al. disclose the use of novel triazine compounds as antiozonants for rubber. Noteworthy is the statement at col. 2, lines 13–16 that the novel arylenediamine triazine of the invention provided exceptional long term ozone protection under static conditions without using wax. At col. 9, lines 5–8 Cornell et al. state that their inventive compounds may be used in combination with other antiozonant agents, and less preferably with microcrystalline waxes as are commonly used to protect against static ozone attack.

U.S. Pat. No. 6,201,049 Sakamoto et al.)discloses the use of N-(1-methylheptyl)-N'-phenyl-p-phenylenediamine ("6PPD") and N-(1,3-dimethylbutyl)-N'-phenyl-p-phenylenediamine ("8PPD") as antioxidant agents in a rubber composition used for tire sidewalls.

In U.S. Pat. No. 4,696,753 Umland et al. disclose the use of between 50–70 per cent by weight of polyethyleneglycol or polyglycol ether in combination with aluminum bronze, in conjunction with a wetting agent, as a lubricant for a tire and wheel assembly. The lubricant is applied as a thin layer, external to the tire, between the tire and rim assembly, to prevent damage or destruction of the tire due to slippage when the tire is operated for a long period of time in a deflated state.

In U.S. Pat. No. 4,501,616 Fink et al. disclose the use of polyoxypropylenediols or polyoxypropylenepolyoxyethylenediols, of molecular weights greater than 6000, as a lubricant/release agent which is added to the rubber before vulcanization during the tire manufacturing process.

In U.S. Pat. No. 4,666,518 Hallenbeck et al. disclose the use of a wax mixture for inside and outside tire paints for uncured rubber tires. The mixture contains different ratios of low melting temperature and high melting temperature waxes, such as paraffin and carnauba waxes, respectively. The tire paints contain release agents which enable the cured rubber tires to be removed from the tire mold.

Hartz (U.S. Pat. No. 4,137,358) discloses the use of a hydrocarbon wax as an additive to tire fabrics (such as tire cords) to protect them from adverse effects of exposure to atmospheric oxidation, as well as to adverse effects from combustion products present in fuel-oil or kerosene-fired dryers and curing ovens. The preferred wax has a molecular weight of approximately 1 500 and a melting point of point of between 160–215 degrees F. The waxes are comprised of mostly straight chain linear paraffins with molecular weights ranging from about 300 to about 1500.

Majumdar, in U.S. H1,871 discloses elements of the manufacturing of rubber tires. and indicates that addition of waxes as antiozonants can impair the tack of the curable rubber compounds when added in an amount that exceeds their solubility.

Therefore, there is a need for employing a low molecular weight polyethylene wax in rubber formulations that can improve the processability of the rubber formulation, and which can increase the resistance of that formulation to environmental factors, such as ozone.

The present invention is an additive for use in rubber tires. The product is a commercially available low molecular weight polyethylene wax, sold by Marcus Oil and Chemical under the tradename M300. Product M300 is a low molecular weight polyethylene homopolymer having an average molecular weight of approximately 1000–1100, and a melting point of 116 degrees C. Compound M300 was used in rubber compounds for automotive use, and found to increase the processability of the compound, and to enhance the rubber compounds' resistance to attack by ozone.

SUMMARY OF THE INVENTION

It is an object of the present invention to provide an additive which can increase the processability of rubber compounds.

Another object of the present invention is to provide an additive which can increase the resistance of rubber goods to attack by atmospheric agents such as ozone.

Still another object of the present invention is to provide a rubber formulation which has increased processability.

Another object of the present invention is to provide a rubber compound which has increased resistance to attack by atmospheric agents such as ozone.

Another object of the present invention is to provide a low molecular weight polyethylene wax which can be economically produced.

The present inventors have unexpectedly discovered that a high density polyethylene with very low molecular weight (900–1,500 Mn) can be used effectively in rubber compounds to both reduce the degradation effects of ozone on the rubber article and provide for improved processing of the rubber compound without the negative effect of reducing green tack of the unvulcanized rubber compound.

The present invention relates to a rubber composition obtained by blending 1 to 3.5 phr (parts per hundred parts by weight of rubber) of a low molecular weight (Mn 900–1500), high density polyethylene wax while eliminating all of the traditional polyethylene wax (Mn 2000–3500) and substantially reducing the amount of microcrystalline wax used in the compound.

The resulting rubber compound has significantly improved tack verses prior art which aids in tire building as well as the fabrication of any built up rubber article (i.e. hose and belts). The compound also exhibits superior Static Ozone Resistance when compared to prior art. Additionally the favorable processing characteristic exhibited by the traditional polyethylene processing aids is maintained through the use of the present invention.

BRIEF DESCRIPTION OF THE SEVERAL VIEWS OF THE DRAWING

FIG. 4 summarizes physical properties of the rubber formulations.

DETAILED DESCRIPTION OF THE INVENTION

The present invention is an additive for use in rubber tires. The product is a commercially available low molecular weight polyethylene wax, sold by Marcus Oil and Chemical (Houston, Tex.) under the tradename M300, which is produced by the polymerization of ethylene using the conventional Ziegler process, and then refined into various polyethylene wax grades.

Product M300 is described as a low molecular weight polyethylene homopolymer having an average molecular weight of approximately 1000–1100, a melting point of 116 degrees C. (DSC peak melting point, measured by the ASTM D 3418 test method) The Mettler drop point of M300, as measured by the ASTM D 3954 method, is 118 degrees C., and its hardness (ASTM D 1321) is 2 dmm. The viscosity of M300 is 20–40, measured using the ASTM D3236 method for viscosity determination, and M300 has a density of 0.94 grams/cc, measured by the ASTM D 1505 method. Product M300 is similar to two other Marcus Oil products, designated as M200 and M500, which differ in their viscosity; the M200, M300 and M500 having viscosities of 10–20, 20–40, and 40–60, respectively. In other respects, such as Mettler drop point, melting point, hardness, density and molecular weight, these compounds are similar.

The M300 was used in rubber compounds for automotive use, and increases the processability of the compound, and enhances the rubber compounds' resistance to attack by ozone.

The present invention relates to a rubber composition containing a wax, which consists of polyethylene wax with a molecular weight number (Mn) from approximately 900 to approximately 1200. A diene rubber is employed conventionally in the use of rubber goods. As the diene rubber there are for example, natural rubber (NR), butadiene rubber (BR), styrene-butadiene rubber (SBR), isoprene rubber (IR) and the like. The diene rubbers may be used alone or in optional admixture of two or more. Among them, combination use of NR and BR is particularly preferable from the viewpoint of having a balance of desirable properties such as kneading and extruding and cut growth resistance. By substitution of the natural rubber (Table 1) with a polybutadiene, or other compounds, other rubber formulations, such as, but not limited to, a poly(styrene-butadiene) rubber, a butadiene rubber, an isoprene rubber or an ethylene-propylene diene terpolymer (EPDM rubber), such as disclosed in U.S. Pat. No. 5,216,066, (the content of which is incorporated by reference herein) or mixtures thereof, can be used in conjunction with the compound of the present invention.

The antioxidant (also referred to herein as an antidegradant) of the present invention contains 30 to 100% by weight of N-(1-methylhexyl)-N'-phenyl-p-phenylenediamine (6PPD).

Use of petroleum waxes to control static ozone cracking of rubber compounds is well known to one experienced in the art of compounding rubber. Generally these petroleum waxes contain 20 to 50 carbon atoms with an average number of 40 to 35 carbon atoms as disclosed in U.S. Pat. No. 6,201,049, the contents of which are incorporated by reference herein.

In the present invention, sulfur and an accelerator are preferably blended in an amount satisfying the equation of a weight ratio of sulfur/accelerator =1.5 to 6.0 per 100 parts by weight of the rubber component. Examples of accelerators that may be used to speed the rate of cure are N-tert-butyl-2-benzothiazolyl-sulfenamide (TBBS), N-cyclohexyl-2-benzothiazol-sulfenamide (CBS), mercaptobenzothiazole (MBT) and diphenylguanidine (DPG).

In the present invention, in addition to the above-mentioned components, one or more components, such as carbon black, process oil, stearic acid, petroleum resin, zinc oxide, silica, coupling agents, or vulcanization retarders which are usually used in the field of rubber compounding can be incorporated in an amount within a range where the effect of the present invention is not decreased.

The rubber composition for the rubber article of the present invention is obtained by blending together the above ingredients in a conventional manner. Articles such as tires, belts, hose, dampers and other articles can then be formed by conventional means.

The term "green", as used within this specification, in reference to rubber products refers to the product when it is in the unvulcanized, i.e., uncured state, as is known to those skilled in the art.

"Green tack" refers to the ability of components to adhere to each other when the formulation is in its uncured state. The process of vulcanization is known to those skilled in the art.

PREPARATION OF EXAMPLES

For the purpose of illustrating the invention a standard black sidewall formulation was used and its composition is illustrated in Table 1. This formulation typifies that of a radial passenger tire, including both a natural rubber, and a high-cis-polybutadiene ("High-Cis-BR") rubber. Rubber use in tires is by far the most prevalent use of rubber and is used for illustrative purposes here. It can be reasonably assumed that articles of rubber not intended for tire use will exhibit similar beneficial properties due to incorporation of the present invention.

The rubber compounds (M1, M2, M3) were evaluated according to the following methods.

Formulation M1 was used as a standard control upon which to evaluate other samples. Formulation M1 represents a typical formulation that one skilled in the art would use for tire applications.

Formulation M2 is similar to Formulation M1 except that the low molecular weight polyethylene wax, compound M300, the compound of the present invention, is substituted for the polyethylene A-C 617. The significance of this substitution is that the molecular weights and crystalline structure of the two low molecular weight polyethylenes differ significantly and it would not be readily known how the M300 might behave relative to A-C617.

Low molecular weight polyethylene is generally incorporated into rubber articles to enhance the mixing of the various components and to aid in the flow of rubber into molds in the green (unvulcanized) state.

The properties of the A-C 617 and M300 low molecular weight polyethylene are as follows:

|  | Molecular weight (Mn) | Mettler Drop Point (ASTM D-3954) | Hardness Dmm (ASTM D-5) | Density g/cc (ASTM D-1505) | Viscosity- cps @ 140 C. (Brook- field) | Acid Number mg KOH/g |
|---|---|---|---|---|---|---|
| A-C 617 | 3000 | 101C | 7.0 | 0.91 | 180 | Nil |
| M300 | 1000 | 118 | 2.7 | 0.94 | 37 | Nil |

Formulation M3 is similar to formulation M2 except that half of the microcrystalline static antiozonant wax was substituted for with additional quantities of M300 low molecular weight polyethylene in a quantity equivalent to the amount of microcrystalline wax removed.

Other ingredients of the examplary formulations include:

The static antiozonant or microcrystalline wax is a typical grade of microcrystalline wax used for this purpose. The melting point of the microcrystalline waxes used range from 160 to 215 F. and has a molecular weight Mn typically in the 600 to 800 ranges. Another similar type wax is called Fischer-Tropsch wax, which is derived from coal gasification and/or gas to liquid fuel conversion processes.

As the static antioxidant, Antigene 6C (6PPD), commercially available from Sumitomo Chemical Co Ltd was used.

Carbon black was N330 from Cabot and other ingredients, including paraffin, are available as commodities or from suppliers well known in the rubber fabrication industry.

Each of the formulations was mixed in a high shear mixer (Banbury) and made into rubber sheets approximately 6mm thick and 200mm square. Mixing conditions and properties were tested and are illustrated in Tables 2 and 3 and FIGS. 1 & 2. The vulcanization characteristics for the three samples (using the standard Oscillating Disk Curemeter, 320 degrees F.) do not differ significantly (Table 3), indicating that addition of the inventive compound, M300, has no adverse effects on the vulcanization of the rubber formulations.

Effects on Rubber Processability

Figure 1:
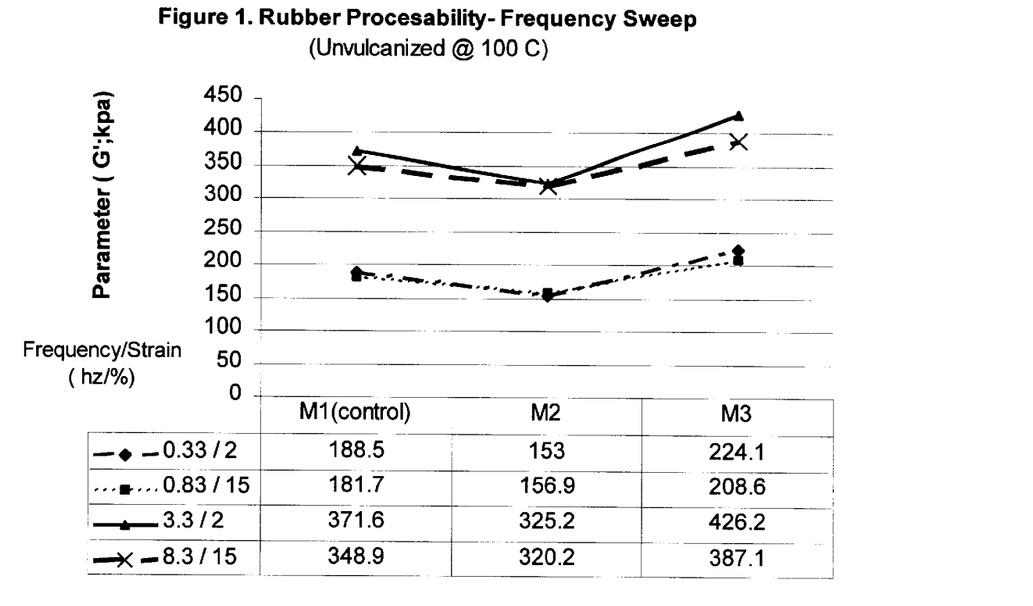
FIG. 1 summarizes the processability of the rubber formulations, using the frequency sweep for unvulcanized rubber. Formulation M1 represents a control sample, and formulations M2 and M3 include the low molecular weight polyethylene wax of the present invention.

FIG. 1 and Table 2 describe the Rubber Processability Analysis of the various rubber formulations, using frequency sweep for unvulcanized rubber compounds. Processability of the rubber formulations was evaluated using the Rubber Processability Analysis designated as RPA2000, in which the shear modulus, reflected by results of the frequency sweep analysis of the unvulcanized rubber, and by hysteresis of the vulcanized rubber preparations.

Table 2 also indicates strain sweep data for vulcanized M1, M2 and M3 samples. The data is shown for three levels of strain (1,10 and 50%). The highest levels of strain are indicative of severe conditions imposed on the rubber in specific applications such as tire sidewalls or rubber belting applications. This data is based on rubber in the vulcanized state, and while it does not reflect on the processability of the rubber compound, the data indicates there is not a great significance in the magnitude of the changes among the formulations, even though the differences in strain sweep may be statistically significant (t-test), Referring to FIG. 1, for unvulcanized rubber compounds, the data represents strain measured at two frequencies, 0.33 and 3.3 hz at both a low level of strain (2%) and at a high level of strain (15%); measurements were again made at two frequencies (0,83 and 8.3 hz). The value of G' is an indicator of rubber processability (shear-strain). It is a measure of the rubber resistance to shear in the unvulcanized state, with lower numbers meaning a lesser shear modulus. The data indicates a lower level of shear-strain for sample M2, containing the compound of the present invention, compared to the control preparation (M1). This property is generally desirable in rubber processing.

The data in FIG. 1 for sample M3, which contains a higher concentration of compound M300, and a lowered concentration of microcrystalline wax (in comparison to formulation M2), indicated a slightly higher shear-strain for this sample compared to the control formulation (M1). Without being bound to any one theory, the results indicate that the microcrystalline component of the rubber formulation is acting to provide greater internal lubrication to the rubber in the unvulcanized state than equivalent amounts of M300-low molecular weight polyethylene wax, while the M300 low molecular weight polyethylene wax is providing greater internal lubrication than A-C 617 low molecular weight polyethylene.

Effect on Tack

Figure 2:
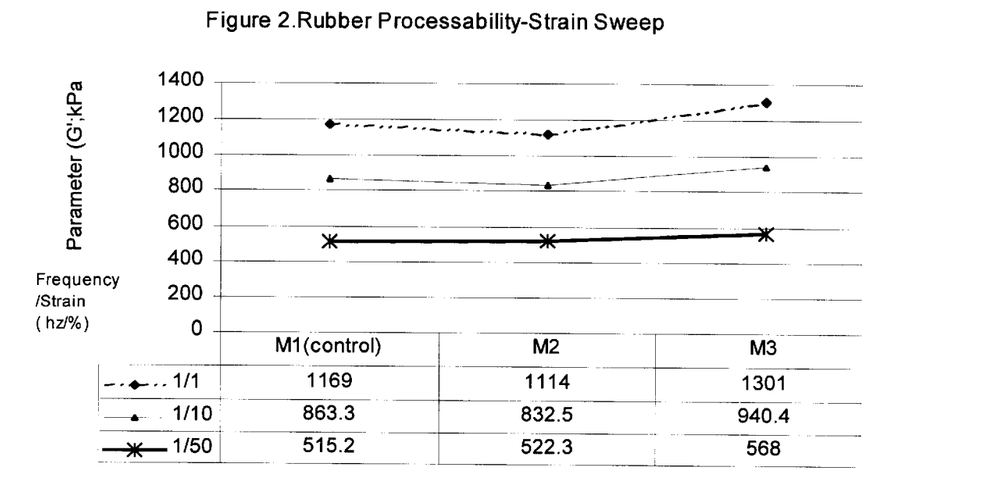
FIG. 2 summarizes the processability of the rubber formulations, using the strain sweep, for unvulcanized rubber.
Figure 3:
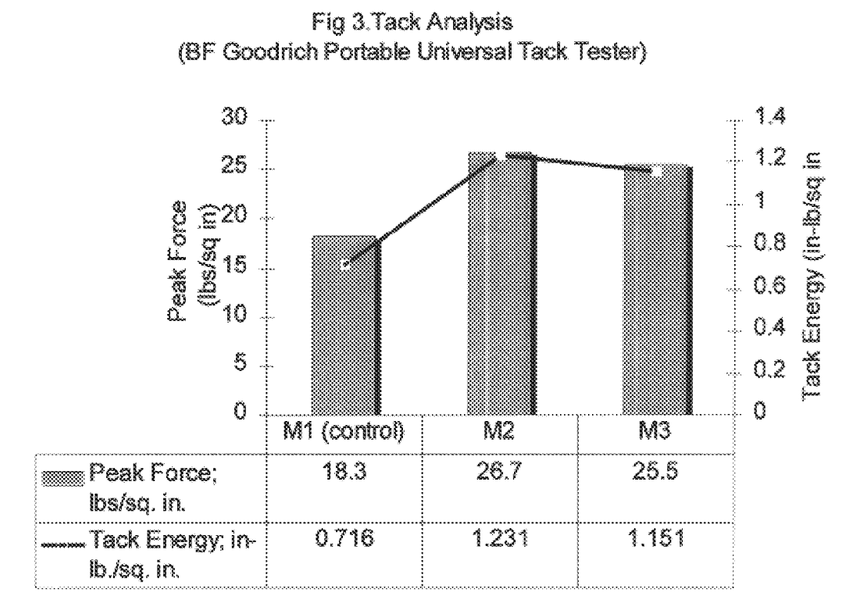
FIG. 3 summarizes the tack of the three rubber samples.

Using a BF Goodrich Portable Universal Tack Tester, the tack of the various formulations, in the unvulcanized state, as indicated in peak force (as pounds per square inch) and as tack energy (inch pounds per square inch) were determined, and the data shown in FIG. 2. Formulations M2 and M3, containing compound M300 of the present invention, showed greater tack, both as increased peak force and tack energy, compared to the control formulation M1. These differences among the three samples are statistically significant (n=5, t-test) and indicate that samples M2 and M3 have higher green tack than the control M1. This result is unexpected, because the addition of any wax, whether a microcrystalline wax or a low molecular weight polyethylene wax, generally results in reduced tack. A reduction in tack is undesirable in many rubber applications where green rubber needs to be built up in layers before vulcanization; lower tack often results in lowered adhesion of the layers to one another. Tack generally helps maintain the integrity of the article during fabrication and vulcanization. Often rubber compounders are limited with the amount of waxes incorporated into rubber articles due to the effect of reducing green tack.

Other Parameters: Modulus, Elongation, Tensile, Hardness and Adhesion

Physical properties of the rubber compounds were determined using various ASTM test protocols, specifically the ASTM D412 test protocol, for "Vulcanized Rubber and Thermoplastic Elastomers-Tensions." Hardness was determined using ASTM D2240 entitled "Rubber Property-Durometer Hardness", for determining Shore A hardness. Adhesion was measured by ASTM D413 entitled "Adhesion: Rubber-Rubber Adhesion to a Model Radial Passenger Tire Sidewall Formulation."

Figure 4A:
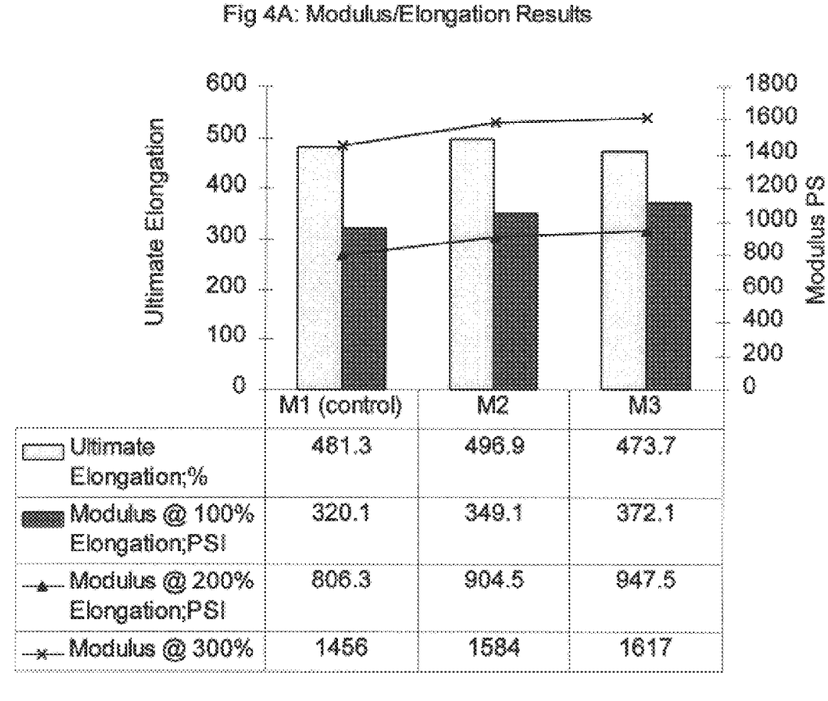
FIG. 4A summarizes the modulus and elongation data for the samples, and FIG. 4B summarizes the tensile and hardness results for these formulations.

FIG. 4 illustrates the modulus and elongation data for the samples M1, M2 and M3. This data indicates that for the vulcanized rubber samples there is an increase in modulus for samples M2 and M3, containing compound M300 of the present invention, compared to the control formulation M1. These results are unexpected as the unvulcanized samples showed the opposite results. Increased modulus in the vulcanized state can be advantageous in compounding rubber due to the ability to control toughness and elasticity of the rubber article.

Figure 5:
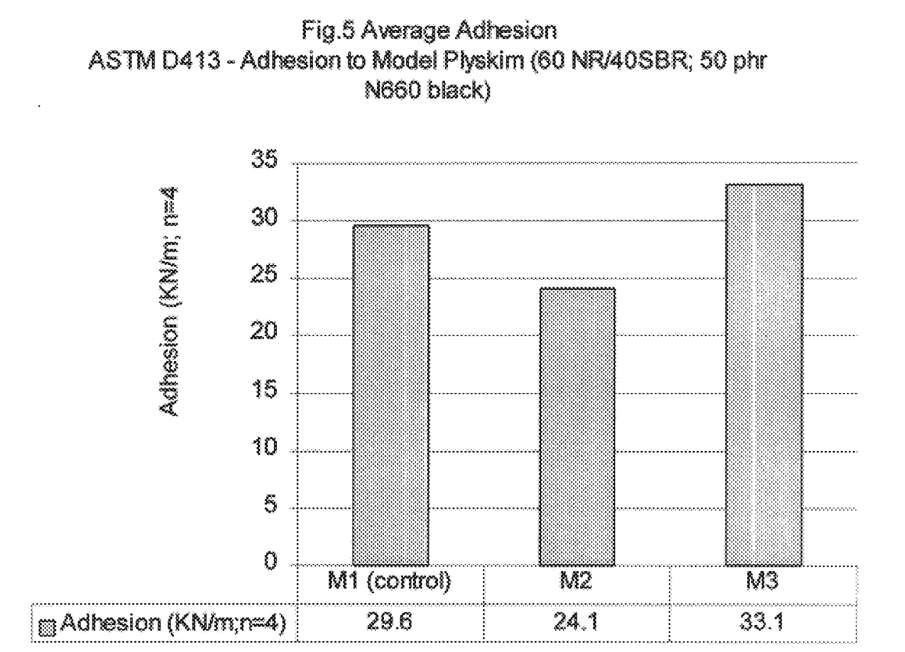
FIG. 5 illustrates adhesion data of the rubber formulations, using adhesion to a model plyskin according to the ASTM D413 protocol.

FIG. 5 illustrates adhesion data to a model plyskin for the formulations M1, M2 and M3. Although the data shows slight differences among the three formulations, statistical analysis of the data (t test) revealed no significant difference in the test data.

Ozone Resistance

Figure 6:
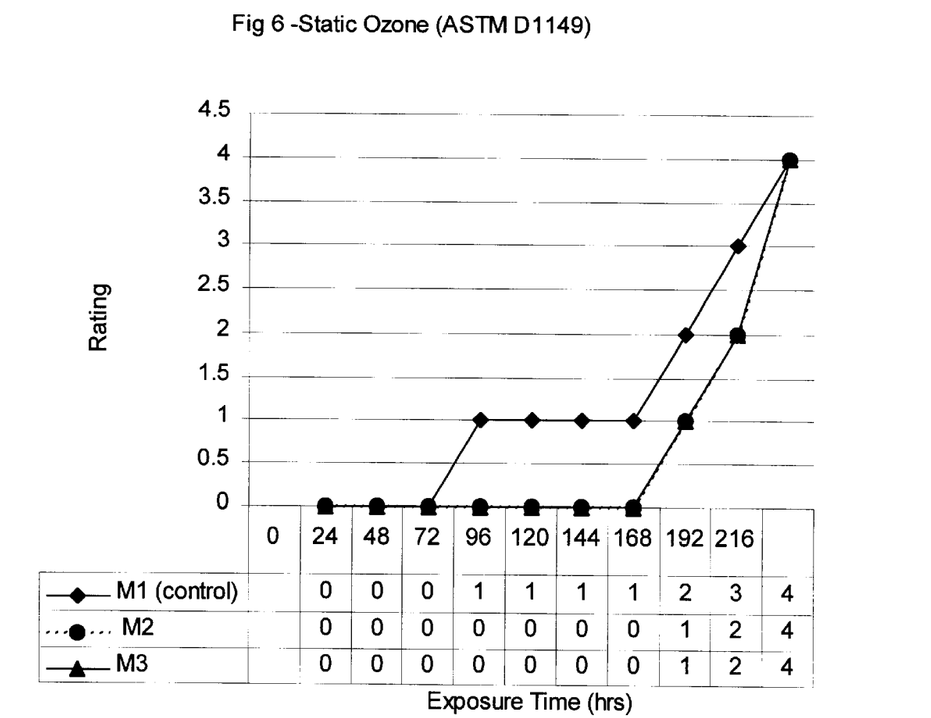
FIG. 6 summarizes the effects of static ozone testing on the rubber formulations.

FIG. 6 and Table 4 shows test data for static ozone testing, indicating improved static ozone results for samples M2 and M3, both containing compound M300 of the present invention, compared to the control formulation M1. In these experiments, the rubber compounds were exposed to an environment containing ozone over a several day period (between 5–9 days) and samples evaluated according to ASTM standard D1149 at various time periods for resistance to ozone. In this method, the formulations were examined microscopically at a 7× magnification, and the degradation of the rubber noted. As shown in both the Table and FIG. 6, formulations containing the inventive compound showed increased resistance to ozone compared to the control formulation.

Other products

While the present invention has been described as being applicable to tires, it will be understood that the present invention can be employed in the composition of other rubber products. By substitution of the natural rubber (Table 1) with a polybutadiene, or other compounds, other rubber formulations, such as, but not limited to, a poly(styrene-butadiene) rubber, a butadiene rubber, an isoprene rubber or an ethylene-propylene diene terpolymer rubber (EPDM rubber), such as disclosed in U.S. Pat. No. 5,216,066, and which is incorporated by reference herein) or mixtures thereof, can be used in conjunction with the compound of the present invention.

Among these products are belts, such as those commonly referred to as either power transmission belts, or V-belts, for use in driving other devices or functions as timing belts, conveyor belts, hoses, gaskets, bushings, weatherstripping, rubber roofing membranes and a variety of other rubber articles which contain a surface that is exposed to the environment, such as described in U.S. Pat. No. 4,956,405, and incorporated by reference herein

TABLE 1

BLACK SIDEWALL FORMULATION

| RAW MATERIAL CATEGORY | FORMULATION TYPE | M1 PHR | M2 | M3 |
|---|---|---|---|---|
| POLYMER | Natural Rubber | 50 | 50 | 50 |
| POLYMER | HIGH-CIS BR | 50 | 50 | 50 |

TABLE 1-continued

BLACK SIDEWALL FORMULATION

| RAW MATERIAL CATEGORY | FORMULATION TYPE | M1 PHR | M2 | M3 |
|---|---|---|---|---|
| LOW MOLECULAR WT PE | A-C 617 | 2 | 0 | 0 |
| LOW MOLECULAR WT PE | M300 PASTILLES | 0 | 2 | 3.5 |
| CARBON BLACK | N550 | 54 | 54 | 54 |
| PROCESS OIL | NAPTHENIC | 7 | 7 | 7 |
| ACTIVATOR | ZINC OXIDE | 3 | 3 | 3 |
| ACTIVATOR | STEARIC ACID | 1.5 | 1.5 | 1.5 |
| STATIC ANTIOZONANT WAX | MICRO-CRYSTALLINE | 3.0 | 3.0 | 1.5 |
| ANTIDEGRADANT | 6PPD | 2 | 2 | 2 |
| PRIMARY ACCELERATOR | SANTOCURENS | 0.9 | 0.9 | 0.9 |
| TOTAL SULFUR | CRYSTEX OT | 2.0 | 2.0 | 2.0 |
|  | TOTAL | 175.4 | 175 | 175 |
|  | CALCULATED SP GR | 1.104 | 1.104 | 1.104 |

TABLE 2

Rubber Process ability Analysis: RPA 2000

| Type Test | Vulcanization State | Temp; Deg. C. | Strain; % | Frequency; Hz | Parameter | M1 | M2 | M3 |
|---|---|---|---|---|---|---|---|---|
| Frequency Sweep | Unvulcanized | 100 | 2 | 0.33 | G'; kPa | 188.5 | 153 | 224.1 |
|  |  |  |  |  | Tan delta | 0.638 | 0.696 | 0.598 |
| Frequency Sweep | Unvulcanized | 100 | 15 | 0.83 | G'; kPa | 181.7 | 156.9 | 208.6 |
|  |  |  |  |  | Tan delta | 0.596 | 0.648 | 0.567 |
| Frequency Sweep | Unvulcanized | 100 | 2 | 3.3 | G'; kPa | 371.6 | 325.2 | 426.2 |
|  |  |  |  |  | Tan delta | 0.485 | 0.513 | 0.474 |
| Frequency Sweep | Unvulcanized | 100 | 15 | 8.3 | G'; kPa | 348.9 | 320.2 | 387.1 |
|  |  |  |  |  | Tan delta | 0.446 | 0.475 | 0.433 |
| Strain Sweep | Vulcanized | 100 | 1 | 1 | G'; kPa | 1169 | 1114 | 1301 |
|  |  |  |  |  | Tan delta | 0.117 | 0.108 | 0.122 |
| Strain Sweep | Vulcanized | 100 | 10 | 1 | G'; kPa | 863.3 | 832.5 | 940.4 |
|  |  |  |  |  | Tan delta | 0.13 | 0.127 | 0.134 |
| Strain Sweep | Vulcanized | 100 | 50 | 1 | G'; kPa | 515.2 | 522.3 | 568 |
|  |  |  |  |  | Tan delta | 0.292 | 0.284 | 0.287 |

TABLE 3

Vulcanization Characteristics (ODR Curemeter: 320 F.)

|  | M1 | M2 | M3 |
|---|---|---|---|
| Min Torque; in-lbs | 14.0 | 15.1 | 15.8 |
| Max. Torque; in-lbs | 68.0 | 68.8 | 68.6 |
| Scorch: Ts2; minutes | 3.2 | 3.2 | 3.2 |
| T(90%); min. | 7.3 | 7.2 | 7.1 |

TABLE 4

ASTM D1149 Static Ozone Resistance -100 pphm ozone; 5 days

| Exposure Time (hrs.) | M1 (control) | M2 | M3 | Ozone Concentration (pphm) |
|---|---|---|---|---|
| 0 | 0 | 0 | 0 | 50 |
| 24 | 0 | 0 | 0 | 50 |
| 48 | 0 | 0 | 0 | 50 |
| 72 | 1 | 0 | 0 | 100 |
| 96 | 1 | 0 | 0 | 100 |
| 120 | 1 | 0 | 0 | 100 |
| 144 | 1 | 0 | 0 | 100 |
| 168 | 2 | 1 | 1 | 150 |
| 192 | 3 | 2 | 2 | 150 |
| 216 | 4 | 4 | 4 | 150 |

We claim:

1. An additive for use in compounding rubber, the additive comprising a polyethylene homopolymer wax having a number-average molecular weight number (Mn) ranging from approximately 900 to approximately 1500, and characterized by a density ranging from 0.92 to 0.96 grams/cc, a melt viscosity in the range from about 10 to about 60 mPas @ 149 C. (300 F.), and a melting point ranging from about 112 degrees C. to about 118 degrees C. (based on the Mettler drop point method).

2. The additive as described in claim 1, wherein in the polyethylene wax comprises a number-average molecular weight number (Mn) of approximately 1000–1100.

3. The additive as described in claim 2, wherein the polyethylene wax is characterized by a density of approximately 0.94 grams/cc.

4. The additive as described in claim 1, wherein the polyethylene wax increases the rubber's resistance to exposure to environmental factors such as ozone or ultraviolet light.

* * * * *